United States Patent [19]

Blakely-Fogel et al.

[11] Patent Number: 4,864,492
[45] Date of Patent: Sep. 5, 1989

[54] SYSTEM AND METHOD FOR NETWORK CONFIGURATION

[75] Inventors: Debora A. Blakely-Fogel, Georgetown; Glen E. Chalemin, Austin; Stephen P. Cummings, Austin; Carolyn K. Jones, Austin, all of Tex.

[73] Assignee: International Business Machines Corporation, Armonk, N.Y.

[21] Appl. No.: 908,486

[22] Filed: Sep. 17, 1986

[51] Int. Cl.[4] .................................. G06F 15/16
[52] U.S. Cl. ............................. 364/200; 364/513
[58] Field of Search ................. 364/200, 900, 513

[56] References Cited

U.S. PATENT DOCUMENTS 4,493,076 1/1985 Khimeche et al. ............... 371/11
4,545,013 10/1985 Lyon et al. ....................... 364/200

OTHER PUBLICATIONS

Ennis et al., "A Continuous Real-Time Expert System for Computer Operations," IBM Journal of Research & Development, vol. 30, No. 1, Jan., 1986.

Roman, Evelyn, Expert System Software for Telecommunications Applications, pp. 179-183.

Cynar et al., Computers Design Networks by Imitating the Experts, Data Communications, Apr. 1986, pp. 137-145.

Taylor, J. M., Ingram, PRP; "An Expert System for Terminal Fault Diagnosis", pp. 213-219.

Primary Examiner—Allen MacDonald
Attorney, Agent, or Firm—Marilyn D. Smith

[57] ABSTRACT

The system and method of this invention configures the protocols of a network architecture as an expert system. The expert system utilizes the knowledge of the network architecture, and offers intelligent advice to system users in the event of an invalid request to enable the entry of a valid request to establish communications through the network.

14 Claims, 3 Drawing Sheets

| KNOWLEDGE BASE TABLE | | | | | | | 20 |
|---|---|---|---|---|---|---|---|
| INTEGRITY VALUES 22 | | | | REFERENCE POINTERS 23 | | | CHAINS 24 |
| DATA TYPE A | LENGTH B | MIN C | MAX D | E | F | G | H |
| INTE-GER | 2 | 1 | 6 | 3 | LOGICAL UNIT TYPE | 2 | RULE 5 |
| | | | | | | | |
| | | | | | | | |
| | | | | | | | |
| | | | | | | | |
| | | | | | | | |
| | | | | | | | |
| | | | | | | | |

FIG. 2

SYSTEM AND METHOD FOR NETWORK CONFIGURATION

FIELD OF THE INVENTION

This invention relates to processing systems connected through a network, and more particularly to configuring a system in accordance with the protocol of the network architecture while providing the user with feedback indicative of problems associated with an invalid request to facilitate a valid user entry.

BACKGROUND ART

In order for a processing system to communicate to other remote processing systems or devices, the processing system must have an architecture that defines the information flow through the network. One typical network architecture is referred to as Systems Network Architecture (SNA). The Systems Network Architecture comprises a total description of the logical structure, formats, protocols, and operational sequences for transmitting information through the communication system.

Any network architecture is complicated, and involves an extensive group of protocols. Consequently, to establish communications with other systems or devices over a network, an extensive knowledge of the network architecture is needed to ensure the connections meet the protocols of the architecture. A typical system user ordinarily does not have this knowledge base. Thus, a resident expert usually would be needed to assist the everyday user in resolving problems associated with invalid requests.

One solution to resolving these problems was provided in IBM System 38, IBM Displaywriter, and IBM 5280. In these systems a program was provided that prompted the user for desired connections. It then decided whether or not it had received a valid connection from the user. A problem with this solution was that the user did not receive any indication, in the event of an error, of what the user had to do to correct the error. The program did not allow for interaction by the user.

These programs also did not provide the ability to check out contradictions across screens. For example, if a user made one response, that response might limit the available responses on another option screen. These programs did not provide a means to check whether or not the next user response was within the bounds of the available responses, and did not provide cross-checking and interdependency checking.

Also, these programs were not easily adaptable to changes and additions in the protocols of the network architecture. For example, if the protocols of the network architecture were enhanced to provide the ability to add more adapters, modems, and additional communications cards, they did not allow the user to select which applications and adapters the user wanted to support in the network.

Thus, if the network architecture were enhanced to provide additional communications between certain devices, the programs could not support these changes without a costly and burdensome rewrite of the program code.

SUMMARY OF THE INVENTION

It is therefore an object of this invention for a user to establish communications over a network without having personal knowledge of the protocols of the network architecture.

It is a further object of this invention to interface with the system user such that the user receives the knowledge of an expert to enable the user to correct input errors.

It is a further object of this invention to provide cross-checking and interdependency checking.

It is a further object of this invention to efficiently incorporate changes in the protocols of the network architecture.

The system and method of this invention configures the protocols of a specific network architecture as an expert system. The expert system utilizes the knowledge of the protocols of the specific network architecture, and offers intelligent advice to system users in establishing communication through a network.

The system comprises a knowledge base, a control, current data, and an user interface. The knowledge base is represented in rule based information tables. It contains a table of rules of the network architecture known as expert information. The table comprises rules for a specific network environment, interdependencies of user parameters, references, and integrity values such as limits and defaults.

The control is an inference machine which makes decisions by testing the information in the knowledge base against the current data information to facilitate human dialog.

The current data is a combination of profile data and user data. The profile data is the initial data stored on media, but which may be changed by the user. User data is that data which has just been selected by the user.

The user interface, also referred to as the human dialog, is an interactive exchange of input and output to and from the user. It shows the parameters, allowed choices, error messages, and help text of the program being configured.

The control utilizes the user interface to display selection menus to the user. The menus contain the current data which is changeable by the user. As the user keys input to the user interface, the inference engine of the control verifies the input with the rules in the knowledge base table. If the input does not conform to the rules of the knowledge table, the control displays the rule to the user through the user interface to give the user the knowledge needed to correct input errors.

Since the knowledge base comprises a table of rules, the system program of this invention is easy to maintain. When new rules are needed due to enhancements to the network architecture, the new rules are simply added to the table in the knowledge base. No new program, or additional lines of code need to be written.

Since the configuration program of this invention has the basic parts of an expert system in separate distinct parts, the program is easier to maintain, and easier to debug. The program is also faster to run since it works off of data instead of program logic. Additionally, this system program can be readily expanded to be an expert for other programs in addition to the systems network architecture (SNA) simply by adding more expert knowledge through the addition of new rules to the knowledge base.

Since the configuration program confers the knowledge of an expert, this allows a user to configure a complex program in order to establish communications over a network. The intelligence of an expert in the network architecture is in the knowledge base to advise, correct, and update the program parameters for the user.

BRIEF DESCRIPTION OF THE DRAWING

FIG. 2 illustrates a knowledge base table of this invention.

DESCRIPTION OF THE PREFERRED EMBODIMENT

The system of this invention configures the way the network architecture will run with another system. The configuration program 10 (FIG. 1) allows a user to select which adapters, modems, communication cards, and other physical devices are to be supported in the network. A typical network architecture can support a number of applications and adapters. Therefore, the user must pick and choose among these. Additionally, the user must get the right combination of the various devices to ensure that the selected options are compatible.

Figure 1:
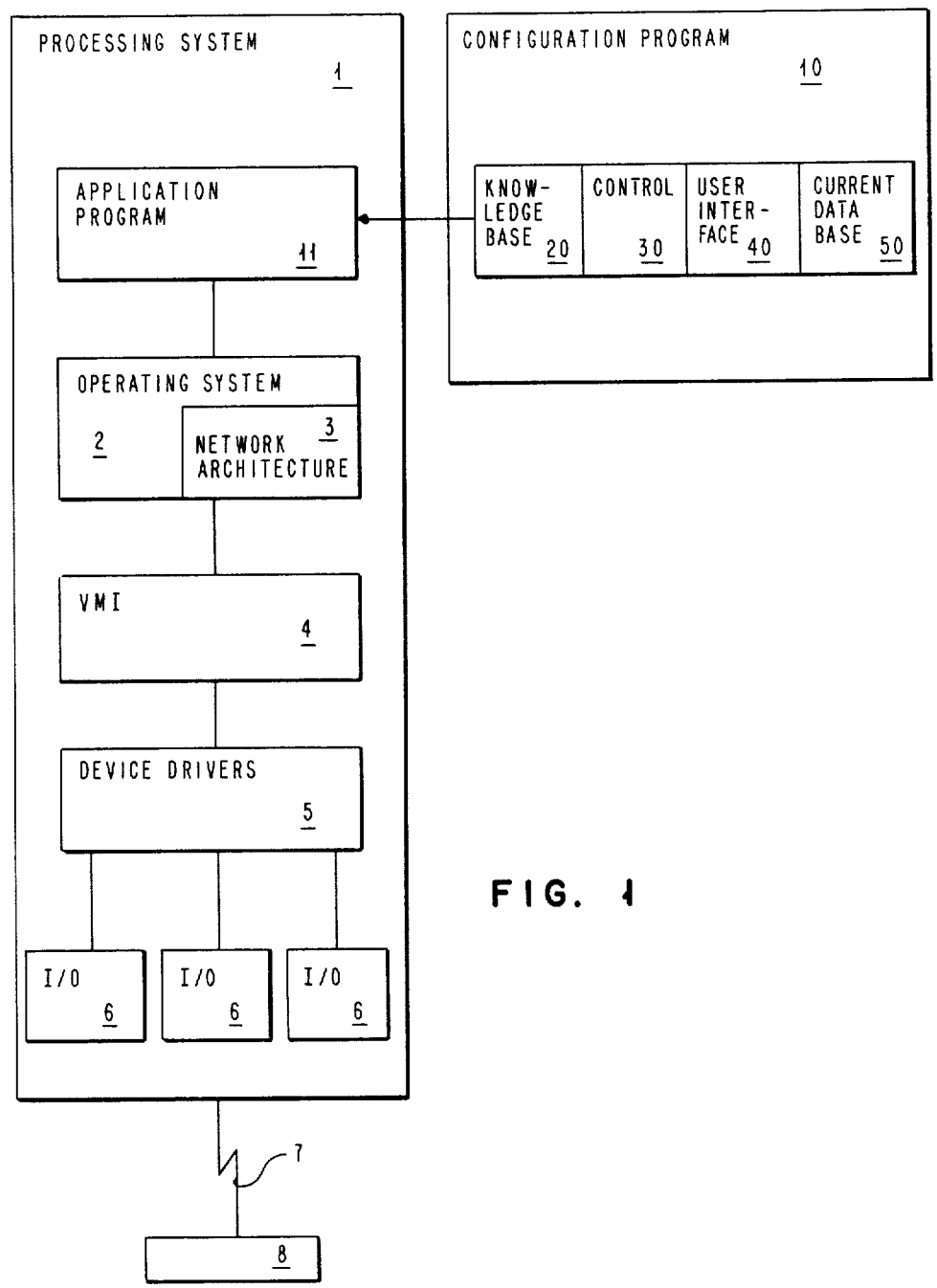
FIG. 1 shows the configuration program of this invention in relation to a typical processing system.

With reference to FIG. 1, the system of this invention comprises a configuration program 10 that runs as an application program 11 in a processing system 1. The configuration program 10 allows a user to establish a connection to another system 8 over a network 7. The configuration program 10 also sets up the information that the network architecture 3 needs to make the connection to another system. Although the configuration program 10 gives the network architecture 3 the information it needs to tie a processing system 1 to the other systems 8, the user still must know among other things the other system's connecting address.

As further shown in FIG. 1, the processing system 1 is shown with the network architecture incorporated into the kernel of the operating system 2 as a file directory as described in copending patent application Ser. No. 908,534, "A Method and System For An Application Program To Communicate Through A Network Protocol", filed Sept. 17, 1986, which is hereby incorporated by reference. The processing system comprises an application program 11 which runs on an operating system 2. All processing goes through the Virtual Machine Interface 4 to the device drivers 5 which control the I/O devices 6. It is understood that the invention described herein is applicable to other processing systems other than the type particularly described herein.

Furthermore, although the invention is particularly described herein with reference to Systems Network Architecture (SNA), it is understood that this invention is applicable to other network architectures as well.

The application program 10 of this invention comprises a knowledge base 20 containing rules 21 (FIG. 2), a control 30 which is an inference engine, a user interface 40 which is the dialog between the user and the system, and a current data base 50 containing either default data base information or information selected by the user.

The knowledge base 20 comprises rules 21 as shown in FIG. 2. The rules 21 contain expert knowledge about the network architecture and the network architecture adapters that are supported by the particular network architecture such as SNA. For example, a rule 21 may cover the type of information being supplied, such as whether the information supplied is a connection name. If it is a connection name, a rule will cover the allowable names a user may select. The rules may state which characters can comprise an allowable name. The rule might state that connection names can only comprise the letters between capital A and Capital Z, an asterisk *, and the dollar sign $.

As shown in FIG. 2, the knowledge base 20 is shown as a table of knowledge rules 21 with fields A-H in each rule 21 for reference pointers 23, integrity values 22, and chains 24. The chains 24 reference and point to other related rules 21 as appropriate. Reference pointers 23 link the knowledge base 20 with the current data 50 and the user dialog 40.

Integrity values 22 insure valid user data with ranges and data types. Integrity values 22 are tested against the user's input parameter selections in the user interface 40 to verify the data's integrity. The information from the user must be of the correct data type, length, and minimum and maximum ranges as indicated in fields A, B, C, and D, respectively. These fields maintain the integrity of the information keyed in by the user.

The reference pointers 23 and integrity values 22 are used together as a rule to check related data values in the user's data base. The table of knowledge rules is chained when a rule is related to another rule. The chained rule is processed next to validate the integrity of the related user's data.

The reference pointers 23 comprise fields E, F, and G. Field E contains the variable name of the current data as the user has changed it. Field F is the variable name of the prompt. Field G is the current data pointer that points to the current data as it resides on a hard file. This is the current data prior to the system's acceptance of the user's input.

Since the expert knowledge is in table format, the expert knowledge can be easily increased by adding rules and chaining one rule to another rule without changing any program logic. Since expert knowledge is very complex and interrelated, the ability to chain the rules together more accurately simulates this complexity and interrelatedness of the expert knowledge.

Figure 3:
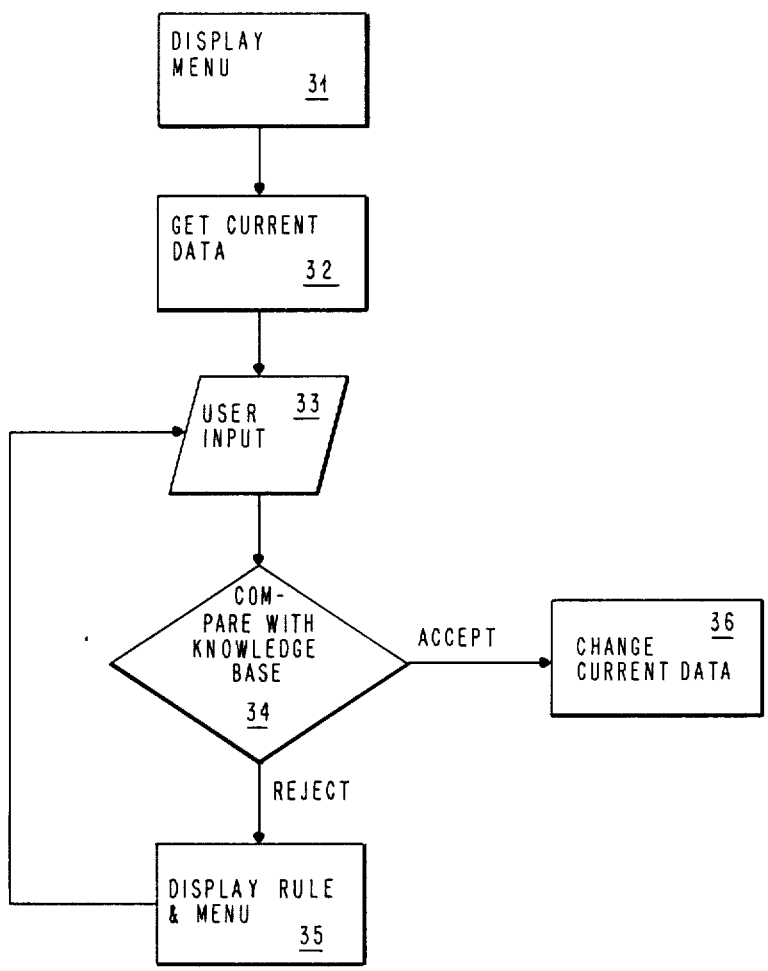
FIG. 3 shows a flow chart of the steps involved in the interaction between the control, the user interface, the current data, and the knowledge base.

Referring back to FIG. 1, together with FIG. 3, the control 30 displays menus to the user, step 31 FIG. 3, through an I/O display device 6. These menus comprise the different parts of a network that need to be configured in order to have communication established between them in a network. For example, the menus may reference different adapters, network nodes, or various logical units of the network environment for configuration. The control 30 accesses the current data base 50, step 32, and displays the current data 50 on the screen as options to the user.

Then the user makes an input into the display menu, step 33, by making a selection, or making changes to the current data 50 displayed in the menu in step 32. The control 30 performs as an inference engine and takes the user's input via the reference pointers 23, and applies it against the knowledge base 20 to see if it follows the rules 21 of the network architecture, step 34.

Steps 33-35 provide the interaction of the configuration program 10 between human dialog of the user interface 40 with the expert knowledge that resides in the rules 21. If the user's input conforms to the rules 21 of the network architecture, then the user's input becomes the current data in the current data base 50 as it resides in I/O storage device 6 of 50 is referenced by field G of the reference pointers 23 of a knowledge rule 21. The user's input replaces the data previously residing in the current data base 50. If the user's input does not conform to the rules 21 of the network architecture, then the control 30 accesses the user interface 40 to display to the user the rule 21 the user needs to correct the error of the user's previous input, step 35.

As described above, the control 30 manages the interaction between the other three components, the user interface 40, the current data 50, and the knowledge base 10. The control 30 displays the current data using the dialog of the user interface. On the screen is displayed the current prompts and the current selections. When the current selections are changed, the inference engine of control 30 compares it against the knowledge base 20. The rules a user needs to make knowledgable corrections in the input are displayed to the user through the user interface.

By maintaining the knowledge base 20, the control 30, the user interface 40, and current data 50 as separate identities, the system 1 can access these different components as needed, and make the system more responsive to the user. For example, when a user inputs through the user interface, the system branches into a table within the knowledge base to verify the input. If the input contains errors, the system feeds the corresponding rule back to the user to inform the user of the correction required.

Referring to FIG. 2, rule 1 is the rule for logical unit (LU) types. The data type 22A is an integer for this rule 1. The length 22B is 2 bytes. The minimum value for an LU type is 1 as shown in field 22C. The maximum value for an LU type is 6 as shown in field 22D. Field 23E contains the user input which in this case is the value 3. Field 23E may also contain a pointer to a memory address containing the current data. Field 23F contains a pointer to memory containing the variable name of the prompt displayed to the user which in this case is "Logical Unit Type". Also associated with field 23F, is the advice to a user which may state "A Logica Unit type is an integer having 2 bytes with a minimum value of 1 and a maximum value of 6". Field G, is the current data, or a pointer to the current data, which in this case may be the value 2. Other rules relating to Logical Unit Types can be accessed through chain 24H. In this case, rule 1 is chained to rule 5.

DESCRIPTION OF OPERATION Description of Operation step 31 in FIG. 3, the menu may request whether the user wants a timeout on a connection. The response from the user would be a "y" or a "n". Column A of FIG. 2, would list the timeout information as a specific data type. Therefore, if the user keyed in a response of "5", the inference engine of control 30 would check this input against the integrity value 22 and find that it did not correspond to the data type in field A. A rule 21 may be displayed to the user through the dilog of the user interface that the only correct response would be a "y" or a "n".

As another example, the user interface 40, may display the current data 50 with respect to a current connection profile name as "Bldg22". The user may change the current data 50 through the user interface 40. If the user inputs the name "BLDG247/1", the inference engine of control 30 will compare the input and verify that the input is a connection name which is the correct data type according to field A of the integrity values 22. However, the inference engine of control 30 will compare the length of the name (9 characters) with the length field B of integrity value 22. If the length field B limits the length of connection names to eight characters, a rule will be displayed to the user that the connection name must not contain more than eight characters. Furthermore, another rule may be chained to the previous rule that states that a connection name can only comprise the letters between capital A and capital Z, an asterisk *, and a dollar sign$. This chained rule will then be displayed to the user through the user interface.

Although the foregoing invention has been particularly shown and described with reference to the preferred embodiments thereof, it will be understood by those skilled in the art that other changes in form may be made without departing from the spirit and scope of the invention.

What is claimed:

1. A method for establishing communications over a network comprising:
   receiving input data from a user through a user interface; and
   comparing the input data with a knowledge base containing rules of a network architecture; and
   determining the validity of said input data from said comparison of said input data with said rules of the network architecture.

2. The method of claim 1 further comprising the step of displaying to the user through said user interface said network architecture rule corresponding to said input data after determining that said input data is invalid.

3. The method of claim 1 further comprising the step of storing said input data in a database of current information for establishing a connection over the network when said input data is valid.

4. The method of claim 1 wherein the network architecture is a systems network architecture.

5. A system for establishing a network configuration in accordance with protocols of a network architecture comprising:
   a current data base representing a current state of the network configuration;
   means for displaying the current data base and input data to a user;
   a knowledge base having a table of rules of the network architecture; and
   means for applying the input data against the knowledge base for determining the validity of said input data; and
   means for storing the input data in said current data base if said input data is determined to be valid.

6. The system of claim 5 wherein the table of rules further comprises a chain to another rule.

7. The system of claim 5 further comprising means for displaying to the user through the user interface the rules of the network architecture corresponding to the user input data determined to be invalid.

8. The system of claim 5 wherein the table of rules further comprises integrity values.

9. The system of claim 5 wherein the table of rules further comprises reference pointers.

10. A computer program product having a computer readable medium having computer program logic recorded thereon for establishing a network configuration in accordance with a plurality of protocols of a network architecture, said computer program product comprising:
    means for incorporating the protocols of the network architecture into a table of rules;

means for determining the validity of user input data with said table of rules; and means for feeding back to the user at least one of said rules in said table of rules if said user input is determined to be in valid.

11. The computer program product of claim 10 further comprising means for adding a plurality of additional rules to the table of rules independently from the computer program logic.

12. A computer program product having a computer readable medium having computer program logic recorded thereon for receiving input data, from a user of a data processing system, for establishing a network connection in accordance with protocols of a network architecture, comprising:

means for incorporating the protocols of the network architecture into a table of rules;

means for referencing at least one dependent rule within one of said rules in said table of rules;

means for determining the validity of user input data with said one of said rules and said at least one of said dependent rules; and means for feeding back to the user at least one of said rules in said table of rules if said user input is determined to be invalid for correcting an error in said invalid user input data.

13. The computer program product of claim 12 further comprising means for adding rules to the table of rules, and means for changing an interdependence between the rules, independently from the computer program logic.

14. The computer program product of claim 12 further comprising means for storing said user input data in a database, if said user input data is determined to be valid.

* * * * *